United States Patent [19]
Schoon

[11] Patent Number: 5,250,982
[45] Date of Patent: Oct. 5, 1993

[54] APPARATUS AND METHOD OF IMAGING UV-SENSITIVE MEDIA

[75] Inventor: David J. Schoon, Mendota Heights, Minn.

[73] Assignee: Schoonscan, Inc., Mendota Heights, Minn.

[21] Appl. No.: 914,450

[22] Filed: Jul. 15, 1992

[51] Int. Cl.⁵ .................... G03B 27/02; G03G 21/00
[52] U.S. Cl. ...................................... 355/78; 355/77; 355/91; 355/133; 355/202
[58] Field of Search ................ 355/202, 77, 133, 79, 355/91, 27, 78

[56] References Cited
U.S. PATENT DOCUMENTS
4,647,182 3/1987 Pierce ............................. 355/77 X Primary Examiner—Richard A. Wintercorn
Attorney, Agent, or Firm—Merchant, Gould, Smith, Edell, Welter & Schmidt

[57] ABSTRACT

An apparatus and method for transferring xerographically printed information on a piece of paper (102) to an ultraviolet sensitive medium (101). The paper (102) can be optionally treated with a chemical (207) to enhance ultraviolet light transmission through the paper (102). The paper (102)/medium (101) assembly may be advanced via nip rollers (432, 433) at a predetermined rate so as to optimize time of exposure to the ultraviolet light source (410).

20 Claims, 4 Drawing Sheets

APPARATUS AND METHOD OF IMAGING UV-SENSITIVE MEDIA

FIELD OF THE INVENTION

The present invention relates to methods of obtaining useful images on ultraviolet-sensitive media with the use of xerographic laser printers.

BACKGROUND OF THE INVENTION

Various imaging media, most notably those which involve a photopolymerization reaction, require ultraviolet light for exposure. Examples of such media include printing plates, printed circuit boards, and 3M's Dynamark sign material.

Obtaining imagewise exposure of such media is costly and may require the services of a service bureau of another company which specializes in the use of appropriate imaging equipment.

Office printers have generally been viewed as unsuitable for preparing the images used in creating these signs, printing plates, or printed circuit boards.

Customary usage of ultraviolet-sensitive media is as follows. Computer data is prepared describing the desired image to be created. This data is then converted to raster format using a Raster Image Processor, or RIP, and sent to a laser imager. This imager, typically using a He-Ne laser, Argon ion laser, or laser diode, images onto silver halide film sensitive to the wavelength of the laser. The resultant film is black in regions where the final media is intended to be imaged. The film is then contact printed to obtain a wrong-reading, reversed image of the original film. The original film, when viewed facing the emulsion side, is readable. The contact print, when viewed facing the emulsion side, is wrong reading, i.e. lines of text read from right to left. Moreover, the areas to be imaged are white, rather than black. These reversals of image sense and color allow the contact print to then be placed in contact with the final media (e.g. sign material) and exposed in a contact printer using ultraviolet light. Following the exposure of this media, it is chemically processed to remove areas which were not exposed to the light.

It should be noted that the contact print (film to film) and the final imaging step (film to sign or other material) occur with the two media in pressurized contact with each other (e.g. in a vacuum frame contact printer) and includes emulsion to emulsion contact. Emulsion to emulsion imaging is desirable inasmuch as minimal spreading of the image occurs.

The original recording of the image onto silver halide film requires expensive equipment, this including not only the imager but also a chemical processor required for development of the film. A film recorder, such as the Linotype Linotronic L300 TM, costs about $50,000. A film processor may cost another $10,000, and may create various environmental problems. Companies which make signs often cannot afford such equipment, and/or may wish to avoid the environmental problems, and so must send floppy disks containing the image information out to a service bureau for preparation of films and negatives. After these are returned to the company making the sign, the contact exposure of the sign material is made. This process is both time-consuming and expensive.

Xerographic laser printers, e.g. the Hewlett-Packard Laserjet IIIP TM, are usually capable of imaging the same information as is used by the service bureau. Such printers are usually less than 1/10 as expensive as the equipment used to create images onto film. If such printers could be used for creating signs, they could be made much more economically and quickly.

SUMMARY OF THE INVENTION

This invention addresses ways of creating images on ultraviolet light-sensitive media, using ordinary xerographic office printers for the creation of the image.

Another area addressed by this invention is to provide optimal sharpness of the resultant image and to minimize the exposure time required.

Another area addressed by this invention is to minimize the presence of artifacts in the resultant image.

Another area addressed by this invention is to accomplish the exposure of the photosensitive material automatically, and at low cost, and with equipment of small size.

Software modifications are made either within the host computer or within the Raster Image Processor (RIP) or within the xerographic laser printer itself to convert the image from right reading (text reads from left to right) and normal video (areas to be black on the final media are black in the xerographic image) to wrong reading (text appears as a mirror image, reading right to left) and reverse video (areas to be black on the final media are white in the xerographic image, and vice versa). In some printers, the Raster Image Processor is packaged to reside within the printer itself.

The paper produced by the xerographic printer is placed, toner side to emulsion side, in contact with the ultraviolet sensitive media. The non-toner side of the paper is exposed to ultraviolet light, while the paper and media are kept in intimate physical contact.

In a first embodiment, a feature that utilizes the characteristic of the paper that permits the paper to transmit some ultraviolet light is used, and the duration of exposure or intensity of exposure is increased so as to compensate for the absorption and reflection of ultraviolet light by the paper.

In a second embodiment, the paper is saturated with a chemical which increases its translucency to ultraviolet light. This being done, the amount of exposure required or the intensity of exposure is closer to that which would be required if a film negative were used.

In a third embodiment, similar to the second embodiment, a very thin film intermediate is used between the paper and the UV-sensitive media, so as to prevent chemical changes in the latter as a result of the chemical used to saturate the paper.

In a fourth embodiment, nip rollers are used to apply a chemical to increase translucency and insure good contact between the two. This being done, the photosensitive material and paper are exposed in an automatic device. The liquid holds the photosensitive material and the paper in contact with the other while the exposure is being made.

DETAILED DESCRIPTION OF THE INVENTION

Ordinary xerographic printing is well adapted to the use of paper as a medium. It is true that overhead transparencies can be made on most xerographic printers using a special mylar substrate. The surface of the mylar is roughened so as to improve its receptivity for toner. Nevertheless, upon close examination it can be seen that black areas on the mylar contain many pinholes. These pinholes would cause objectionable artifacts to occur if the mylar were used as an imaging master. Paper is preferable to mylar for imaging inasmuch as it has the porosity and roughness (i.e. high surface area on a micro scale) to provide for a thick layer of toner on the surface. The fibrous structure of paper is ideal for enabling black areas to be imaged without pinholes or voids.

Figure 1:
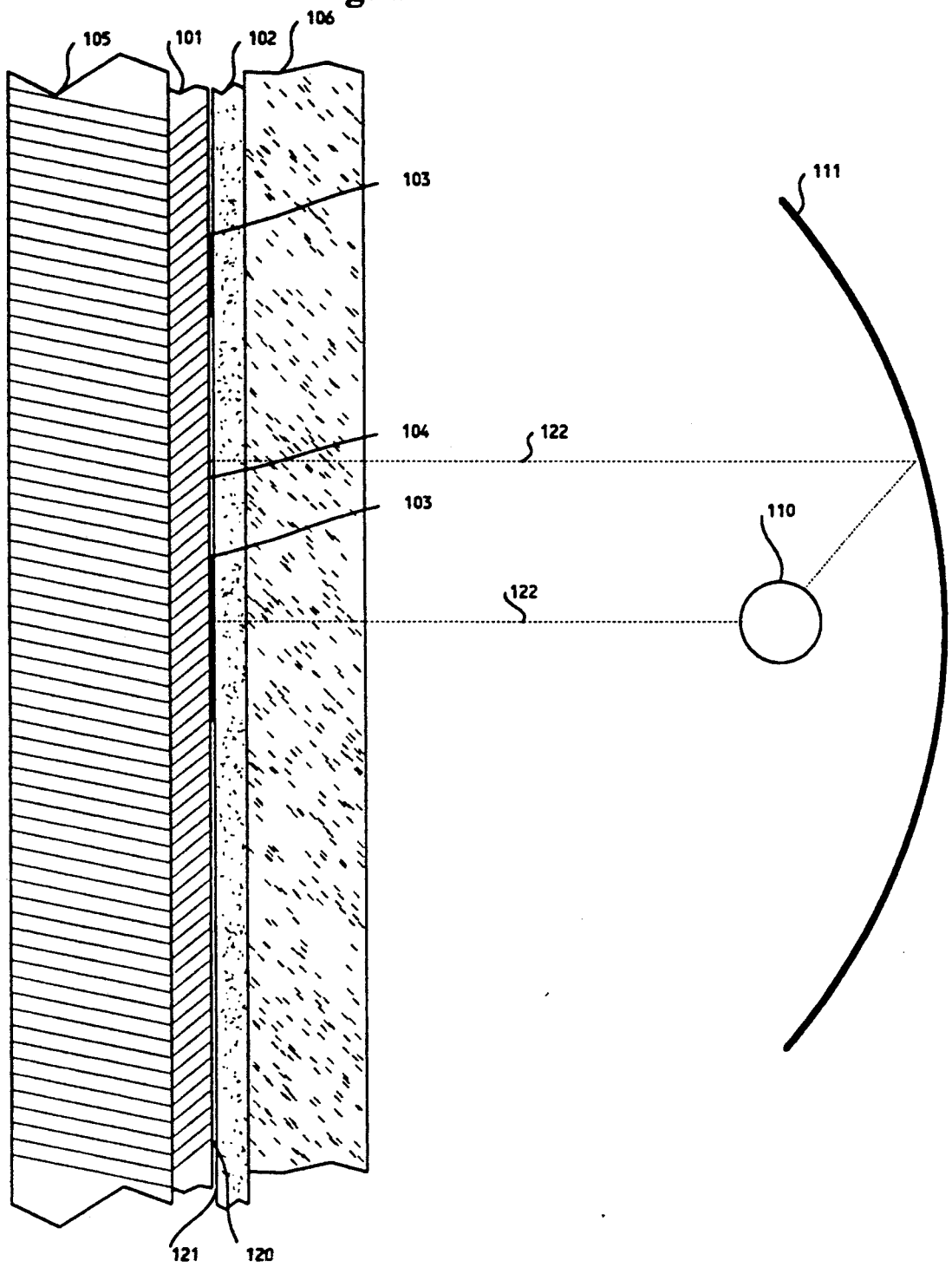
FIG. 1 is a partial elevation showing a first preferred embodiment of a device embodying the principles of the present invention.

It should also be understood that paper transmits considerable amounts of light. While the amount is significantly less than might be transmitted by clear film, nevertheless enough light is transmitted to enable photosensitive materials to be imaged. The way the photosensitive material (e.g. sign media) is imaged is illustrated in FIG. 1.

The photosensitive media, 101, is placed, emulsion side, 120 to the right, next to a sheet of paper 102 which has been imaged with its toner side, 121, to the left. Toner exists in regions such as 103 on the paper 102. The two sheets 101 and 102 are held together by glass plate 106 and pressure pad, 105. Alternatively or in addition to the use of a pressure pad 105, a vacuum hold down system could be used (not shown). The paper is illuminated by ultraviolet light source 110 with optional reflector 111. The light passes through the paper 102 via, for example, paths 122 so as to cause areas 104 not obstructed by toner 103 to receive light. The exposure time is adjusted as needed to compensate for the amount of light absorbed and reflected by the particular type of paper being used.

The nature of the ultraviolet source 110 is determined to some extent by the spectral response curve of the photosensitive medium 101. For most photopolymer materials, significant illumination in the 350 nm wavelength region is desired. Ultraviolet lights such as the ones provided in EPROM erasers (the devices which erase the computer chips which hold data) are good choices. The party lights which cause some fluorescence of some materials, but are safe to the eye, are poor choices since the wavelengths which are harmful to the eye (350 nm and below) are best at generating photopolymerization.

After the exposure is completed, the photosensitive media 101 is removed and chemically processed in a manner consistent with practices well known in the state of the art.

In most situations the image created on the paper should be reversed, both in terms of right and left and in terms of black and white. This could be done in any of a number of ways, including the following:

A. Within the printer (not shown), an inverter (not shown) is inserted in the data path so as to reverse the "laser on" and "laser off" states. This causes whites and blacks to be reversed. Moreover, the direction of mirror movement is reversed and the "start of scan" sensor within the printer is moved to the opposite side of the scan line. This causes left and right sides to be reversed. Alternatively, the way data is removed from a data buffer is reversed, or opposite the order that would normally be used.

B. Within the raster image processor, the software is arranged so as to initially start with an entirely black page, in memory, with lines and fonts being represented as white areas on a black background, rather than the reverse. The details of how this would be done would depend on the Page Description Language used. For example, some computer programs support the Hewlett-Packard printers by use of a language called HPGL (Hewlett-Packard Graphics Language). Apple computers tend to use a much more complex, albeit slower, language called Postscript. A programmer would write modified application programs which would produce wrong reading and reverse video. Once that was done, the changes would be transparent to the user.

In the HPGL language, for bitmap graphics, the changes would be very straightforward. The order of the bits would simply be reversed, and the 1's and 0's would be reversed. For text apart from bitmap graphics the procedure would be somewhat more complex. The font library would be processed to make the fonts wrong reading and reversed. Moreover, instructions would be sent to the printer for placement of every character, so as to make the characters flow from right to left rather than the reverse. A record would be maintained for those areas which had been imaged with bitmap graphics or characters. Once the page is finished, font fill characters (black rectangles of various sizes) would be imaged to blacken the areas not otherwise imaged. In the Postscript language, the needed changes can be represented by variations in the "setgray" commands for white and black transformations, and by variations in a transformation matrix, which controls the way left, right, up, and down directions are interpreted. If the changes are applied within the application code, the modifications would be quite simple to implement. Apart from the application, in many cases the needed transformation matrices could simply be inserted at appropriate points into the file. Searches in the output file for transformation matrices and for setgray commands could be done, with appropriate changes made to those commands. Such modifications are well understood by those skilled in the art.

C. Within the host computer, the application software is modified so as to reverse the whites and blacks, and left and right senses. One of the first commands to be output would be one which would represent the entire page as black. This could be done as follows:

0 setgray
    0 0 moveto
    0 792 lineto
    612 792 lineto
    612 0 lineto
    0 0 lineto fill Subsequent to that, for example, a command which normally would have generated a Postscript code of 0 setgray
    x1 y1 moveto
    x2 y2 lineto (which would draw a black line) would be changed to 1 setgray x1 y1 moveto
    x2 y2 lineto
which would draw a white line.

Figure 2:
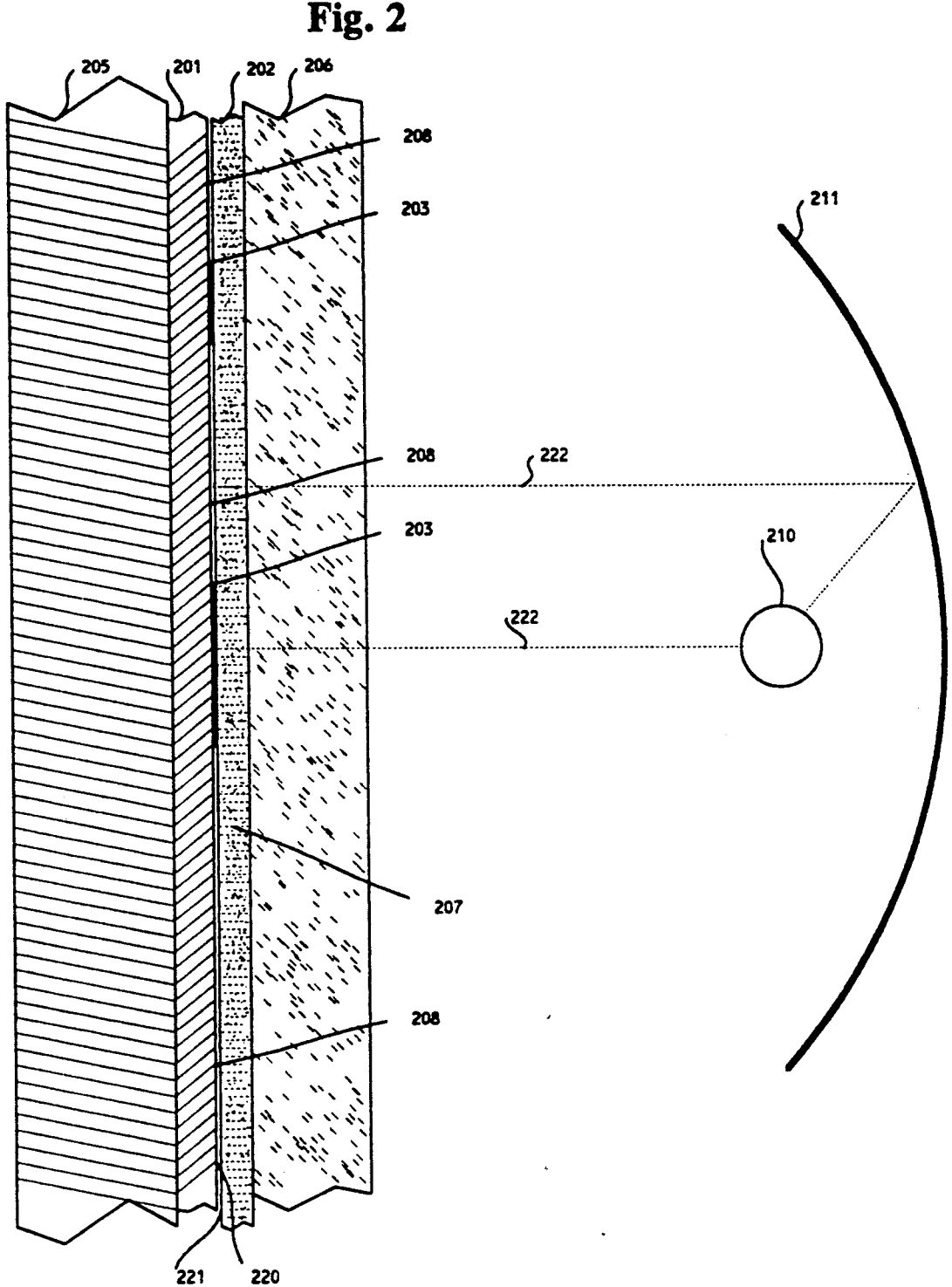
FIG. 2 is a partial elevation showing a second preferred embodiment of a device embodying the principles of the present invention.

The second preferred embodiment is similar to the first, except that the paper is saturated with a chemical so as to improve its transmission of ultraviolet light. FIG. 2 illustrates this second embodiment.

It should be understood that a primary reason for paper's opacity is that the fibers of which it is composed have a significantly different refractive index from that of air. Internally within the paper is an extremely high surface area per unit volume, consisting of these fibers. Consider a ray of light passing into the paper. Light impinging at a more or less normal angle to a fiber will experience some reflection due to the difference in refractive index, but most of the light will pass into the fiber. It is likely that in some instances the light will exit from within the fiber at an angle such as to cause total internal reflection, in which case the light will usually stay within the fiber until it is absorbed. In other cases, the light will approach the fiber at such an angle so as to cause total reflection, in which case the light will bounce around within the paper until it either returns on the side of light incidence, or pass through the paper and exit on the toner side.

When a liquid is added which has a refractive index that is not very different from that of the fibers, significantly less reflection occurs as light enters the fiber, and the critical angles for total external reflection and total internal reflection are changed to make such circumstances much less likely.

FIG. 2 illustrates one way imaging can be done. As in the first embodiment, there is a pressure pad, 205, photosensitive media, 201, (emulsion side, 220, to the right), paper, 202, with toned side, 221, to the left, and toner areas 203. Glass plate 206 holds the components together, and light source 210 and reflector 211 provide illumination.

Liquid 207 saturates the paper, 202. Moreover, the areas between the paper 202 and the photosensitive media 201 are filled with this same liquid 207, these regions illustrated by 208. This liquid provides not only translucency of the paper, but also by virtue of its surface tension and viscosity, once air pockets are removed, holds the paper and photosensitive material together. Thus glass plate 206 and pressure pad 205 become optional rather than essential.

The application of the liquid to the paper can be done in a variety of ways, including putting the liquid in a squeeze bottle and manually squirting about 0.5 ml of liquid on the paper, with spreading of the liquid via a sponge if total coverage is not otherwise obtained.

The desirable qualities for the liquid, 207 and 208, are the following:

Refractive index similar to that of paper.

Surface tension characteristics so as to readily permeate the paper.

Viscosity low enough to not take too long to saturate the paper.

Nonreactive chemically with the paper, toner, and photosensitive material.

With traditional paper-based 3M Dynamark, ordinary mineral spirits satisfy all of these requirements. Other materials may work as well or better. Soapy water is poor inasmuch as it tends to weaken the paper, and takes too long, because of its surface tension characteristics, to penetrate the paper. Cooking oil is poor inasmuch as it takes too long to saturate the paper, because of its viscosity.

Mineral spirits (paint thinner) is good in that it readily saturates the paper, does not cause any wrinkling of the paper, does not loosen the toner, and provides good translucency. It is less than optimal, however, in that it has an objectionable smell. It is also less than optimal in that with very long exposure times (as would be required if the lamp is other than optimal), some chemical reaction with one, but not all, of the 3M Dynamark materials occurs. It is likely that some additional investigation would produce a better chemical which would not have any objectionable odor or health hazard, and yet have the desirable characteristics of the mineral spirits.

Figure 3:
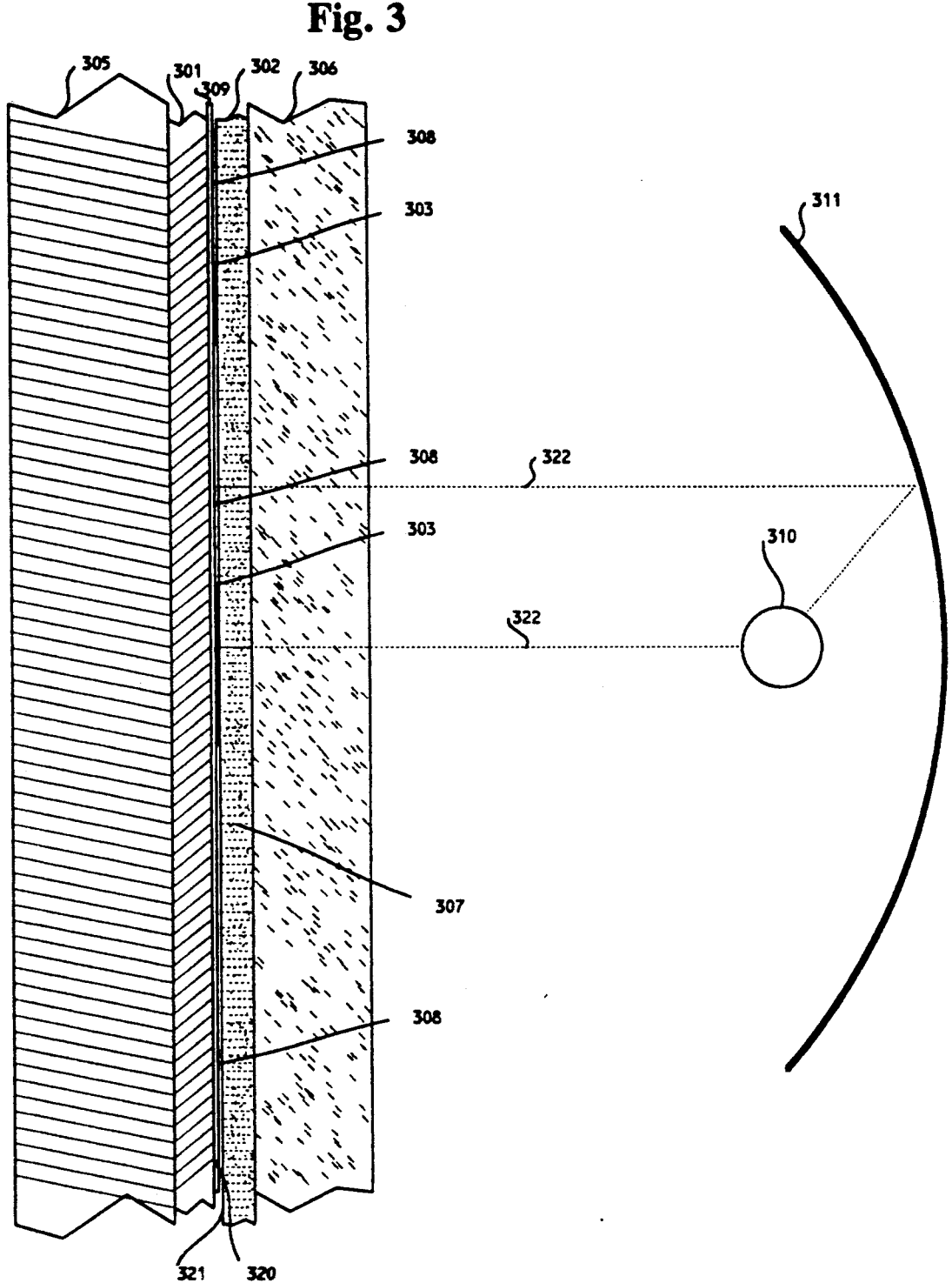
FIG. 3 is a partial elevation showing a third preferred embodiment of a device embodying the principles of the present invention.

Referring to FIG. 3, the third preferred embodiment is similar to the second, except that a very thin film barrier is inserted between the paper and the photosensitive material. This film barrier allows the use of chemicals for saturating the paper which satisfy all of the desired characteristics except for not being unreactive with the photosensitive emulsion. One mil mylar is one example of such a material. It is thin enough that minimal image distortion occurs because of its use. One example of such a film is the original Saran Wrap which was not wrinkled. (The wrinkling is done to make it easier to pull off the roll if the leading edge is lost.) More specifically, 0.5 mil to 1.5 mil mylar or polyester film is suitable.

In FIG. 3, items 301 thru 308 correspond to items 201 thru 208 in FIG. 2.

Specifically, 301 is the photosensitive media, with emulsion side 320 to the right, facing paper 302 with toner 303 to the left. This left side is indicated by 321. Light from lamp 310 and reflector 311 passes through glass plate 306 and paper 302 with liquid 307, exposing photosensitive media 301 in areas not blocked by toner 303. The liquid within the paper is indicated by 308, and the pressure pad by 305. The item which is not present in the second preferred embodiment is film 309, which sits between the paper and photosensitive material. In this case, the pressure pad 305 and glass 306 are required, because the liquid 307 does not prevent separation of the materials as it does in the previously discussed second preferred embodiment.

Figure 4:
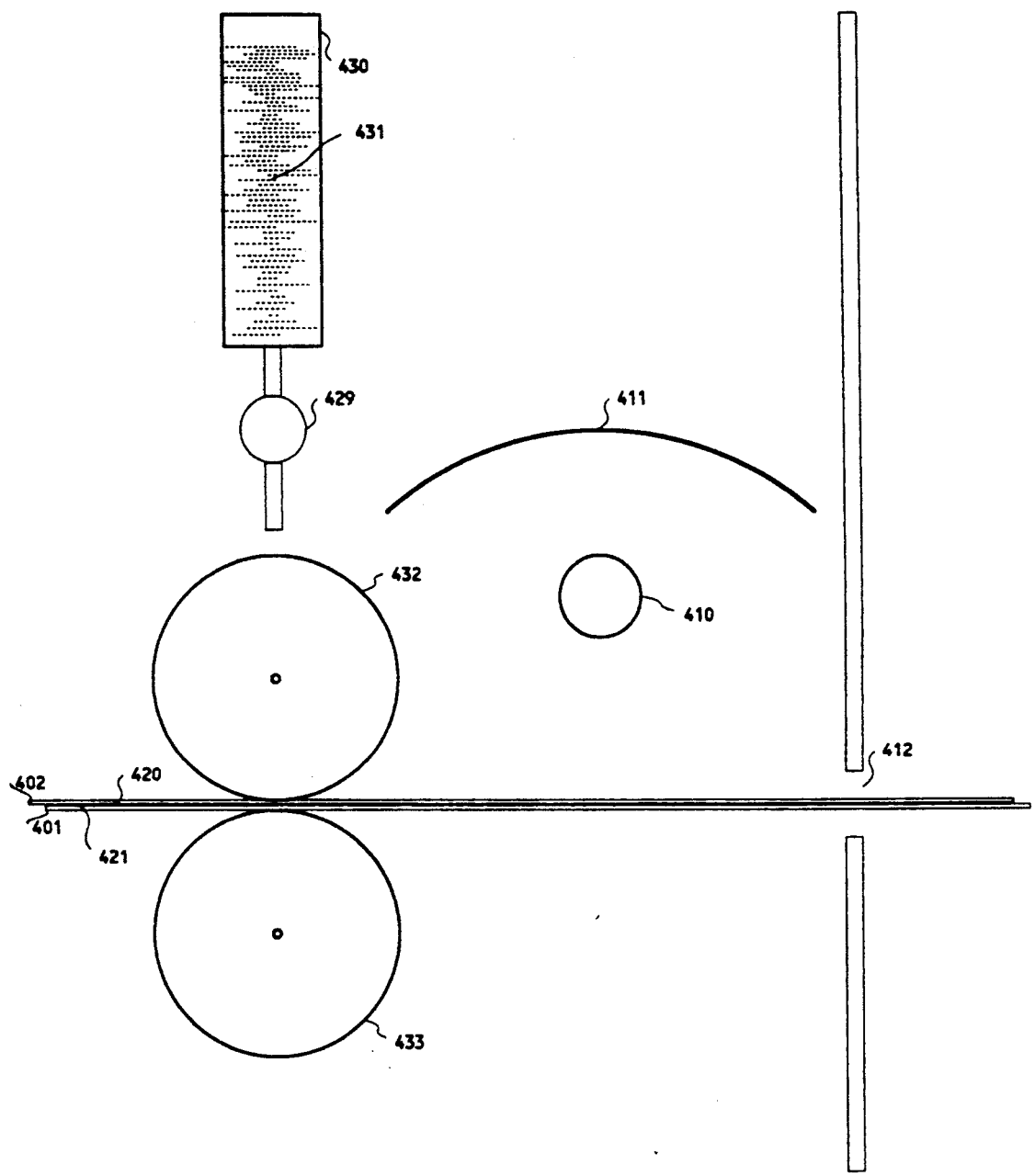
FIG. 4 is a partial elevation showing a fourth preferred embodiment of a device embodying the principles of the present invention.

In the fourth preferred embodiment a degree of automation is added, as illustrated in FIG. 4. The user places paper 402 containing toner, toner side 421 down, on top of photosensitive material (e.g. sign material) 401, with emulsion side 420 up, next to the toner side 421 of the paper. These two items are fed into slowly rotating nip rollers 432 and 433. The nip rollers are turned by a gear motor (not shown), with motion of the material between them being to the right. Nip roller 432 is porous, e.g. an open cell foam. A controlled amount of liquid, 431, stored within bottle 430, is allowed by solenoid or other automatic valve 429 to flow into the nip roller 432, saturating the roller and causing enough of this liquid to contact the paper, 402, to saturate it. As the paper and photosensitive material pass through the nip rollers, the two are in intimate contact so that air bubbles are forced out of their interface. As they emerge to the right of the nip rollers, they are illuminated by lamp 410 and optional reflector 411. The rate of rotation of the nip rollers is set to produce optimal exposure. Following exposure, the materials pass into exit slot 412. Such an automatic exposure unit as this is desirable inasmuch as it occupies very little table space. This is particularly important if large signs or other material are being imaged. The surface tension of the liquid insures that the paper and photosensitive material stay in intimate contact during exposure.

It will be obvious to those skilled in the art that the requirement for wrong reading and reverse video can be eliminated by imaging of a film intermediate first, and then imaging from that onto the final photosensitive media. While this requires an additional step, this would still fall within the scope of this invention. Such an imaging scheme would simplify the software requirements, at the expense of greater media cost and time to create the final image.

I claim:

1. An apparatus for creating an image on a photosensitive medium, comprising:
   a. A photosensitive medium, the photosensitive medium having an emulsion side, the photosensitive medium having a surface area;
   b. A xerographically printed piece of paper, the paper having a toner side; the piece of paper having a surface area;
   c. Clamping means, the clamping means being adapted to hold the emulsion side of the photosensitive medium in an abutting relationship with the toner side of the piece of paper;
   d. A light source, the light source emitting light so as to cause light to pass through the piece of paper and impinge upon the emulsion side of the photosensitive medium, thereby creating an image on the emulsion side corresponding to information printed on the piece of paper.

2. The apparatus of claim 1, wherein the clamping means further comprises a pressure plate, the pressure plate being shaped so as to substantially encompass the surface area of the photosensitive medium.

3. The apparatus of claim 2, wherein the clamping means further comprises a glass plate, the glass plate substantially encompassing the surface area of the piece of paper.

4. The apparatus of claim 3, wherein the light source is an ultraviolet light.

5. The apparatus of claim 4, further comprising a timer, the timer controlling the duration of exposure of the photosensitive medium to the ultraviolet light.

6. The apparatus of claim 5, wherein the ultraviolet light emits light having a wavelength of approximately 350 nm.

7. The apparatus of claim 6, further comprising ultraviolet light transmission enhancing chemical, the ultraviolet light transmission enhancing chemical residing within the piece of paper.

8. A sign imaging apparatus, comprising
   a. A piece of xerographically printed paper, the xerographically printed paper having a toner side and a non toner side;
   b. A glass plate, the piece of paper residing on the glass plate such that the non toner side of the piece of paper is in contact with the glass plate;
   c. A photosensitive medium, the photosensitive medium having an emulsion side and a non emulsion side;
   d. A pressure pad, the non emulsion side of the photosensitive medium residing on the pressure pad;
   e. A film, the film having a first side and a second side, the first side of the film being contiguous with the toner side of the piece of paper and the second side of the film being contiguous with the emulsion side of the photosensitive medium, the pressure pad and the glass plate residing in an adjacent relationship so as to secure the photosensitive medium, the film and the piece of paper in a fixed, layered relationship; and
   f. A light source, the light source emitting light so as to pass sequentially through the piece of paper and the film and impinge the emulsion side of the photosensitive medium, thereby creating an image on the photosensitive medium corresponding to any image on the piece of paper.

9. The apparatus of claim 8, wherein the film is a polyester.

10. The apparatus of claim 9, wherein the film has a thickness within the range of 0.5 mil to 1.5 mil.

11. The apparatus of claim 10, further comprising an ultraviolet light transmission containing chemical, the chemical residing within the piece of paper.

12. The apparatus of claim 11, wherein the light source is an ultraviolet light.

13. The apparatus of claim 12, wherein the ultraviolet light emits light having a wavelength of approximately 350 nm.

14. The apparatus of claim 13 further comprising an optical reflector, the optical reflector being positioned so as to reflect light emitted from the ultraviolet light source toward the piece of paper.

15. The apparatus of claim 14, further comprising a timer, the timer controlling duration of exposure of the light source to the photosensitive medium.

16. A method of imaging information onto a photosensitive medium, comprising the steps of:
   a. Printing information xerographically onto a piece of paper, thereby creating a printed paper having a toner side and a non toner side;
   b. Forming a photosensitive medium, the photosensitive medium having an emulsion side and a non emulsion side;
   c. Placing the toner side of the printed paper onto the emulsion side of the photosensitive medium, thereby creating a paper/medium assembly; and
   d. Exposing the printed paper to a light source, such that light passes through the printed paper and impinges the photosensitive medium so as to create an image on the photosensitive medium corresponding to the information on the printed paper.

17. The method of claim 16, further comprising the step of saturating the paper with a light transmission enhancing chemical.

18. The method of claim 17, further comprising the step of feeding the paper/medium assembly into a pair of rollers, thereby forcing the printed paper and the photosensitive medium into intimate contact, thereby removing air bubbles formerly trapped between the paper and the medium.

19. The method of claim 18, further comprising the step of rotating the rollers at a velocity so as to advance the paper/medium assembly through the emitted light so as to correspond with a residence time within the light appropriate to a desired exposure of the photosensitive medium.

20. The method of claim 19, further comprising the step of:
   housing the rollers and the light source within an enclosure, the enclosure having an exit orifice, such that exposed photosensitive medium exits the enclosure via the exit slot.

* * * * *